Patented Sept. 2, 1930

1,775,040

UNITED STATES PATENT OFFICE

ANNETTE R. JENNINGS, OF BROOKLINE, MASSACHUSETTS, ASSIGNOR TO ANNETTE'S PERFECT CLEANSER CO., OF BOSTON, MASSACHUSETTS, A CORPORATION OF MASSACHUSETTS

CLEANSER

No Drawing. Application filed February 17, 1928. Serial No. 255,204.

This invention relates to a composition for removing from delicate fabrics, spots or stains such as are caused by water, perspiration, milk, coffee, syrup, fruit juices, oil, grease, or the like, without leaving a "ring" or any other trace of the spot.

It is an object of the invention to provide a cleansing agent which is easily applied, which acts quickly, which is entirely harmless to the most delicate fabrics, and which removes every trace of spots or stains.

My composition comprises essentially a pulverulent vehicle with which is intimately mixed a relatively small amount of a softening or loosening agent which preferably has detergent properties. For the powdery vehicle, I may use talc, chalk, or the like, these substances being particularly adapted for cleansing light colored fabrics. With the vehicle, I mix a small proportion of a suitable essential oil, a liquid soap, or an equivalent softening agent, the quantity of oil preferably used being insufficient to alter the appearance or feel of the powder. While various oils, such as oil of turpentine, camphor, cedar, pine, rosemary, and the like, or mixtures of such oils, may be employed with success, I find that Australian eucalyptus oil is particularly efficacious and satisfactory. I have discovered that this oil has marked detergent qualities and is effective not only on oily or greasy spots, but on stains made by aqueous liquids, such as fruit juices, milk, coffee or the like, though it is not as effective as an eradicator of staining substances when used alone as when used with the powdery vehicle. The action of the oil in loosening stains of aqueous liquids is greatly enhanced by the use of moisture therewith.

While various substances as hereinbefore stated may be mixed in various proportions to give fairly satisfactory products which cleanse effectively, my preferred formula for making cleanser according to the invention is as follows:—

I take a pound of a very fine powdery vehicle and thoroughly mix therewith a fluid ounce of Australian eucalyptus oil. The mixture is passed through a fine sieve to remove any small lumps which may be present. To the screened powder, I add three more pounds of powder and mix for about seven minutes. The resulting product is indistinguishable by inspection from untreated powder. Instead of ordinary talc or powdered soapstone, I prefer a talc-like mineral which is found in North Carolina, is known as "pyrophyllite" and is a hydrated aluminum silicate containing about 70 per cent. of $SiO_2$ and 24 per cent. of $Al_2O_3$, with 4 per cent. of water. This mineral closely resembles talc in physical properties except that it is somewhat more efficacious as a drying powder than true talc.

In removing oily or greasy spots, the cleanser is preferably applied directly to both sides of the fabric, with or without moisture, and is gently pressed or rubbed into the fabric. This may be allowed to stand for some time, say over night, though a much shorter period will in many cases be ample. The dry powder is then brushed off the fabric. If the fabric is not too sheer to permit handling, it may be worked with the fingers after the application of moistened powder until the moisture has dried out, whereupon the dry powder may be brushed off, taking the spot or stain with it. This method takes but a few minutes.

For stains made by aqueous substances, such as coffee, milk, fruit juices, perspiration, etc., the cleanser is applied with moisture sufficient to form an aqueous paste. A piece of clean rag may be dampened and then used to pick up some of the cleanser and rub it on the spot to be removed, both sides of the fabric being thus treated. The fabric is then preferably worked with the fingers until the moisture has entirely evaporated, whereupon the powder may be brushed off, taking the spot or stain with it.

It is to be understood that the particular substances and quantities mentioned are not by way of limitation but for the purposes of illustration only, and that the invention includes all such modifications as fall within the scope of the following claims.

I claim:—

1. A dry cleansing composition for fabrics, consisting essentially of a talc-like powder with a small proportion of an essential oil distributed therethrough.

2. A dry pulverulent cleansing composition for fabrics, consisting essentially of a talc-like powder with a small proportion of an essential oil distributed therethrough.

3. A dry cleansing composition for fabrics, consisting essentially of a talc-like powder with eucalyptus oil distributed therethrough.

4. A dry pulverulent cleansing composition in powdery form for fabrics, consisting essentially of a talc-like powder with eucalyptus oil distributed therethrough.

5. A dry cleansing composition for fabrics, consisting essentially of finely powdered pyrophyllite with an essential oil mixed therethrough.

6. A dry pulverulent cleansing composition for fabrics, consisting essentially of finely powdered pyrophyllite with an essential oil mixed therethrough.

7. A dry cleansing composition for fabrics, consisting essentially of a mixture of talc-like powder with an essential oil in the approximate proportion of four pounds of powder to one fluid ounce of soil.

8. A dry pulverulent cleansing composition for fabrics, consisting essentially of a mixture of talc-like powder with eucalyptus oil in the approximate proportion of four pounds of powder to one fluid ounce of oil.

In testimony whereof I have affixed my signature.

ANNETTE R. JENNINGS.

CERTIFICATE OF CORRECTION.

Patent No. 1,775,040.                                September 2, 1930.

ANNETTE R. JENNINGS.

It is hereby certified that error appears in the printed specification of the above numbered patent requiring correction as follows: Page 2, line 26, claim 7, for "soil" read "oil"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.

der with a small proportion of an essential oil distributed therethrough.

2. A dry pulverulent cleansing composition for fabrics, consisting essentially of a talc-like powder with a small proportion of an essential oil distributed therethrough.

3. A dry cleansing composition for fabrics, consisting essentially of a talc-like powder with eucalyptus oil distributed therethrough.

4. A dry pulverulent cleansing composition in powdery form for fabrics, consisting essentially of a talc-like powder with eucalyptus oil distributed therethrough.

5. A dry cleansing composition for fabrics, consisting essentially of finely powdered pyrophyllite with an essential oil mixed therethrough.

6. A dry pulverulent cleansing composition for fabrics, consisting essentially of finely powdered pyrophyllite with an essential oil mixed therethrough.

7. A dry cleansing composition for fabrics, consisting essentially of a mixture of talc-like powder with an essential oil in the approximate proportion of four pounds of powder to one fluid ounce of soil.

8. A dry pulverulent cleansing composition for fabrics, consisting essentially of a mixture of talc-like powder with eucalyptus oil in the approximate proportion of four pounds of powder to one fluid ounce of oil.

In testimony whereof I have affixed my signature.

ANNETTE R. JENNINGS.

CERTIFICATE OF CORRECTION.

Patent No. 1,775,040.  September 2, 1930.

ANNETTE R. JENNINGS.

It is hereby certified that error appears in the printed specification of the above numbered patent requiring correction as follows: Page 2, line 26, claim 7, for "soil" read "oil"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.